(12) United States Patent
Camiel

(10) Patent No.: US 8,051,053 B2
(45) Date of Patent: Nov. 1, 2011

(54) SYSTEM AND METHOD FOR DATA STORAGE FIREWALL ON DATA STORAGE UNIT

(76) Inventor: Noam Camiel, Tel Aviv (IL)

( * ) Notice: Subject to any disclaimer, the term of this patent is extended or adjusted under 35 U.S.C. 154(b) by 242 days.

(21) Appl. No.: 11/763,409

(22) Filed: Jun. 14, 2007

(65) Prior Publication Data

US 2007/0266063 A1     Nov. 15, 2007

Related U.S. Application Data

(60) Provisional application No. 60/813,974, filed on Jun. 16, 2006.

(30) Foreign Application Priority Data

Mar. 2, 2006  (WO) .................. PCT/IL2006/000287

(51) Int. Cl.
*G06F 17/30* (2006.01)
(52) U.S. Cl. ........ 707/694; 707/609; 707/821; 707/822; 707/823; 707/824; 707/825; 707/826; 707/827; 707/828
(58) Field of Classification Search .................. 707/609, 707/694, 821–828
See application file for complete search history.

(56) References Cited

U.S. PATENT DOCUMENTS

| | | | | |
|---|---|---|---|---|
| 5,931,947 | A * | 8/1999 | Burns et al. ........................ | 726/4 |
| 6,931,530 | B2 * | 8/2005 | Pham et al. ................... | 713/165 |
| 6,961,833 | B2 * | 11/2005 | Leung ............................ | 711/163 |
| 7,669,051 | B2 * | 2/2010 | Redlich et al. ................. | 713/166 |
| 2004/0103147 | A1 * | 5/2004 | Flesher et al. ................. | 709/204 |
| 2005/0210291 | A1 * | 9/2005 | Miyawaki et al. ............ | 713/201 |
| 2006/0075478 | A1 * | 4/2006 | Hyndman et al. .............. | 726/11 |
| 2007/0294756 | A1 | 12/2007 | Fetik | |
| 2011/0087899 | A1 * | 4/2011 | Fetik ............................ | 713/193 |

OTHER PUBLICATIONS

Wallace et al., MCSA/MCSE Self-Paced Training Kit: Microsoft® Windows® 2000 Professional: Exam 70-210, Aug. 2002, Microsoft Press, Second Edition, pp. 220-223, ISBN 978-0-7356-1766-7.*

* cited by examiner

*Primary Examiner* — Frantz Coby

(57) ABSTRACT

A system and method is introduced for implementing a storage firewall for protecting files when a storage device connects to a digital appliance. A storage device may connect to a number of appliances and is therefore at risk of getting infected with viruses and other malware risking subsequent transfer of these infections to other appliances. The storage device is further at risk of leaking sensitive information or loosing critical information. The storage firewall protects data on a storage device that connects to a digital appliance in various manners using a standard, unencrypted partition and a standard file system. Protected and unprotected files may reside homogeneously on the file system of the storage device. Using the storage firewall, files on digital appliance may be protected from infected files residing on storage device connected to digital appliance. No application is required to be activated on digital appliance when storage device connects to digital appliance. Protection is activated by default and carried out by storage device.

17 Claims, 5 Drawing Sheets

SYSTEM AND METHOD FOR DATA STORAGE FIREWALL ON DATA STORAGE UNIT

CROSS-REFERENCE TO RELATED APPLICATIONS

This application uses the frammis vane disclosed in International Application Number PCT/IL06/00287, filed Mar. 2, 2006 by the present inventor.

This application claims the benefit of U.S. Provisional Patent Ser. No. 60/813,974, filed Jun. 16, 2006 by the present inventor.

FIELD OF INVENTION

This invention generally relates to protecting data on storage units.

More particularly this invention relates to methods of protecting data on a storage unit from any digital appliance that storage unit may connect to. Protection may also be applied to data on digital appliance storage unit connects to.

BACKGROUND OF THE INVENTION

The use of non-volatile digital storage has been a rapidly growing with the advancement of the computer market. The requirement for mobile non-volatile storage has been growing with the use of computer laptops. Furthermore with the requirement for larger capacities for music players such as the iPod player by apple (www.apple.com/ipod) the requirement for digital storage is ever growing. Devices such as digital cameras and mobile phones are using non-volatile memory cards such as the flash-cards by Sandisk (www.sandisk.com) to store images and other data. Other devices of the Key-Chain Storage family by M-systems (www.m-sys.com) include USB connectivity for computers to act as a floppy disk replacement.

Another storage entity that is widely used is a storage server that is located over a network. A server on the network may be used as a virtual drive so that the same virtual drive is available from any computer or appliance that connects to the virtual drive. Such a drive may be a network drive such as a drive located over the network or other types of drives such as the XDrive (http://www.xdrive.com/).

A unit of digital storage such as a computer hard disk, a flash card or a Key-Chain storage device and other such digital storage devices will be referred herein as a digital media storage device, or a media device.

A media device, unlike a floppy diskette includes a controller with some RAM, and or ROM or other memory. This has become necessary as these devices became more complex, managing their media transparently to the appliance, for example, in order to hide media defects and manage the media on a higher level.

Mobile storage medias can connect to a variety of digital appliances. One example is the U3 environment (www.u3.com) and ceedo (www.ceedo.com) in which USB flash drives can be used on different computers to carry user workspace and files wherever the user goes. This ability is efficient for people who move around, who have more than one computer or need to work from home. People who needed laptops can now use a U3 USB device and work from anywhere a computer is found.

Storage drives such as media devices and network drives as described above are useful indeed but pose a security threat for data integrity. A storage device may connect to a number of digital appliances and is therefore at risk of getting infected with viruses and other malware. Storage device may then transfer these infections to other digital appliances that connect to it. The storage device is further at risk of leaking crucial information or loosing critical information due to a hostile appliance the storage device may connect to.

There are various solutions for overcoming these security issues. One approach for dealing with security issues is to create an encrypted file system on the storage device such as in Dekart Disk Firewall. (http://www.dekart.com/products/encrytion/private_disk/) The problem with this solution is that protection does not occur by default. Special software needs to be installed and managed. In addition, there are actually two drives on the device, a protected and unprotected drive. This two-drive property is an undesirable property, requiring user to be aware of the secure environment, leaving it for the user to maintain security.

Another approach is to create several partitions in a storage device, each partition having a separate policy and protection. Such example is explained in patent application to Yu, Roger application 20030131112 titled Computer firewall system. This approach requires partitioning of the storage device and requires the user to be aware of that partitioning and be in charge of security.

The attempt of the present invention is to present a storage firewall system that works by default, on the standard single partition of a storage device, in a transparent manner, without user intervention and without requiring the user to be aware or manage security issues. In addition, this invention presents ways to protect data on a digital appliance that media device connects to.

There is thus a widely recognized need for a storage firewall in a media device that can protect files transparently on a single partition, and it would be highly advantageous to have such a device devoid of the above limitations.

SUMMARY OF THE INVENTION

According to one aspect of the present invention there is provided a system for protecting files on a file storage unit capable of connecting to an external unit said file storage unit comprising:
  a physical file storage;
  an external file interface for communicating with said external unit;
  a storage firewall located in between said physical file storage and said external file interface containing file access rules for allowing or blocking requests between said external file interface and said physical file storage;
  a policy mode indicator containing a policy mode for altering file access rules of said storage firewall whereby said storage firewall is capable of allowing or blocking requests made by external unit depending upon said file access rules and said policy mode of said policy mode unit.

According to a second aspect of the present invention there is provided a method of protecting files, some of which have restricted access conditions, from an external device the method comprising:
  a. storing said files homogenously,
  b. identifying permissions of said stored files as either unrestricted files or restricted access files,
  c. calculating permissions for said stored files using said identified permissions of said stored files and a current policy mode,
  d. allowing full file accessibility functionality for said unrestricted files, whilst restricting file accessibility functionality to restricted files according to said calculated permissions of said stored restricted access files.

According to a third aspect of the present invention there is provided a file storage device for storing files in blocks for subsequent access, the device comprising:

an externally accessible interface for accessing said files, and an internal inaccessible interface located above said block level access to limit access to certain files according to an indication associated with a respective file of a file access restriction, and an internal policy mode indicator containing a policy mode for altering access restrictions as indicated by said indication associated with a respective file of a file access restriction in respect to said policy mode.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

Figure 1:
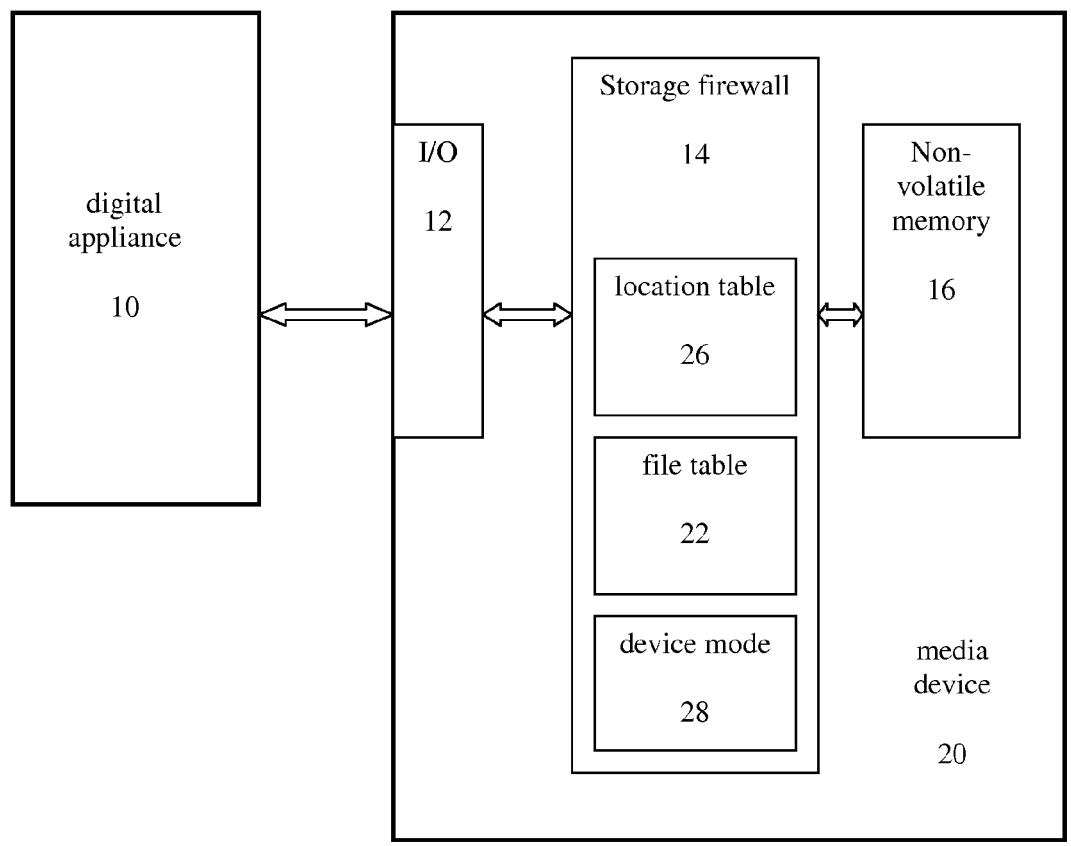
FIG. 1 is a block diagram illustration of a media storage device with a storage firewall that is connected to a digital appliance, according to an embodiment of the present invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

The preferred embodiments teach a storage device firewall mechanism. Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The present invention includes several embodiments that can be realized using a media device described herein. In this disclosure a media device with internal data storage is described where data storage on media device may be protected from direct access of digital appliance. This disclosure provides a way to implement a storage firewall system between media device and digital appliance. This storage firewall may protect files on media device in various ways from digital appliance. This storage firewall may protect media device from viruses and other malicious attacks. This storage firewall may protect digital appliance from being infected by files on media device. This storage firewall may work by default on a single volume of the media device, not requiring the creation of another partition. The storage firewall may protect sensitive files, allowing access to sensitive files only from certain computers or within an organization for example. The storage firewall may operate on a single volume of the media device and work by default, without the user being required to activate protection or be aware of security. Anti-virus or firewall programs running on a computer may crash or malfunction. The storage firewall on the media device works by default internally to the media device and cannot be affected by a compromised digital appliance. The storage firewall may allow or disallow backing up of files depending on file permissions for each file. Protected files may be removed by the user following user authentication for any protected file on media device. The storage firewall may operate on a media device formatted with a standard file system, working using sector oriented operations and having a single partition. Storage firewall is activated by default and enforced by the media device.

The term sector used throughout in this document applies to blocks or clusters that may contain more than one sector. This terminology is used for simplicity.

In the description herein below, the term "Non-Volatile Storage" refers to storage media that remains unchanged when power is shut off. For example, Flash memory and hard drive magnetic media.

In the description herein below, the term "Cluster" refers to a grouping of consecutive sectors of data in a media device.

In the description herein below, the term "LBA" refers to Logical Block Addressing for specifying the location of blocks of data stored on non volatile storage devices. This scheme numbers each block consecutively from 0 onwards and replaces other addressing schemes such as cylinder-head-sector. This disclosure refers to LBA for simplicity but is not limited to LBA representation.

Reference is now made to FIG. 1, which is a block diagram illustration of a media storage device with a storage firewall that is connected to a digital appliance, according to an embodiment of the present invention comprising a media device 20 connected to a digital appliance 10, such as a computer. Media device comprises an I/O unit 12 to communicate with digital appliance 10. Media device further comprises a non-volatile memory unit 16 comprising of non-volatile memory in which both secure and non-secure files may be stored together. Media device further comprises a storage firewall 14 which may also be referred to as block based file management system. Storage firewall is located between I/O unit 12 and non-volatile memory unit 16. Storage firewall holds data for deciding whether or not to allow requested commands received from I/O unit. The storage firewall 14 is also responsible for keeping track of protected files as well as other responsibilities. For carrying out these tasks storage firewall 14 comprises of file table 22, a location table 26 and a device mode unit 28. The file table 22 holds relevant information concerning the stored files, information such as LBA locations occupied by file, file status, file availability etc. The location table 26 holds permission values for each LBA location in memory 16 so that LBA N may have permission P, LBA N+1 may have permission Q etc. The storage firewall uses the information stored in the file table in the process of determining access to stored files. In a further embodiment of the present invention, file management rules define file access levels for respective files. These rules define, for example, which files the user will be able to access, or alter. Some aspects of media device of FIG. 1 are further explained in disclosure of International Application Number PCT/IL06/00287, filed Mar. 2, 2006 by the present inventor. This patent will be referred herein as patent A. In patent A, a plurality of different enforcement policies both internal and external to media device are enforced from within media device. These policies are located within storage firewall 14 in location table 26. These policies may contain permission values for each LBA location in memory 16 for allowing or rejecting read and/or write commands based on permission policy for a specific LBA. These policies are enforced internally by media device and not by digital appliance, therefore not requiring any special activity from digital appliance 10 by default. In addition the policies are enforced on a block level or LBA level and may be enforced using a single volume on media device where protected and unprotected files reside. In some embodiments the device mode 28 residing in storage firewall 14 holds an internal policy mode of the device, so that each LBA policy in location table 26 can be compared to and be carried out or blocked based on the combination result of the two policies. Device mode 28 may be updated for working with a present digital appliance through external requests, such as presenting a user password or a digital certificate. Internal storage firewall may include permissions for files in file table 22 and based on this information, update the policy of each LBA contained in each of the files within file table 22 to have the same security policy as the file it is contained in. This policy may be updated in location table 26. In some embodiments internal storage firewall may make internal decisions for file permissions, for example based on file suffix.

In some embodiments, storage firewall 14 identifies executable files or other files, which may infect digital appliance that media device connects to. Storage firewall 14 may in some cases limit access to such files that may pose a threat to digital appliance. This access limitation may be implemented by removing read permission for such files. An example implementation may include denying some or all of the read data commands arriving from digital appliance for these files. In this manner it may be possible to increase protection of digital appliance from media device that connects to it, such that digital appliance is protected from being infected by media device.

In another embodiment, storage firewall 14 identifies executable files located on media device and prevents any write commands to those files, thereby protecting files on media device from being infected with viruses etc.

In another embodiment, storage firewall 14 includes information about sensitive files and prevents any read commands to those files, thereby protecting sensitive files on media device from being accessed in an unauthorized manner.

In another embodiment, storage firewall 14 includes information about important files and prevents any write or delete commands to those files, thereby protecting important files on media device from being altered or removed in an unauthorized manner. In some embodiments file allocation table may be restored if altered, using data included in file table 22.

Figure 2:
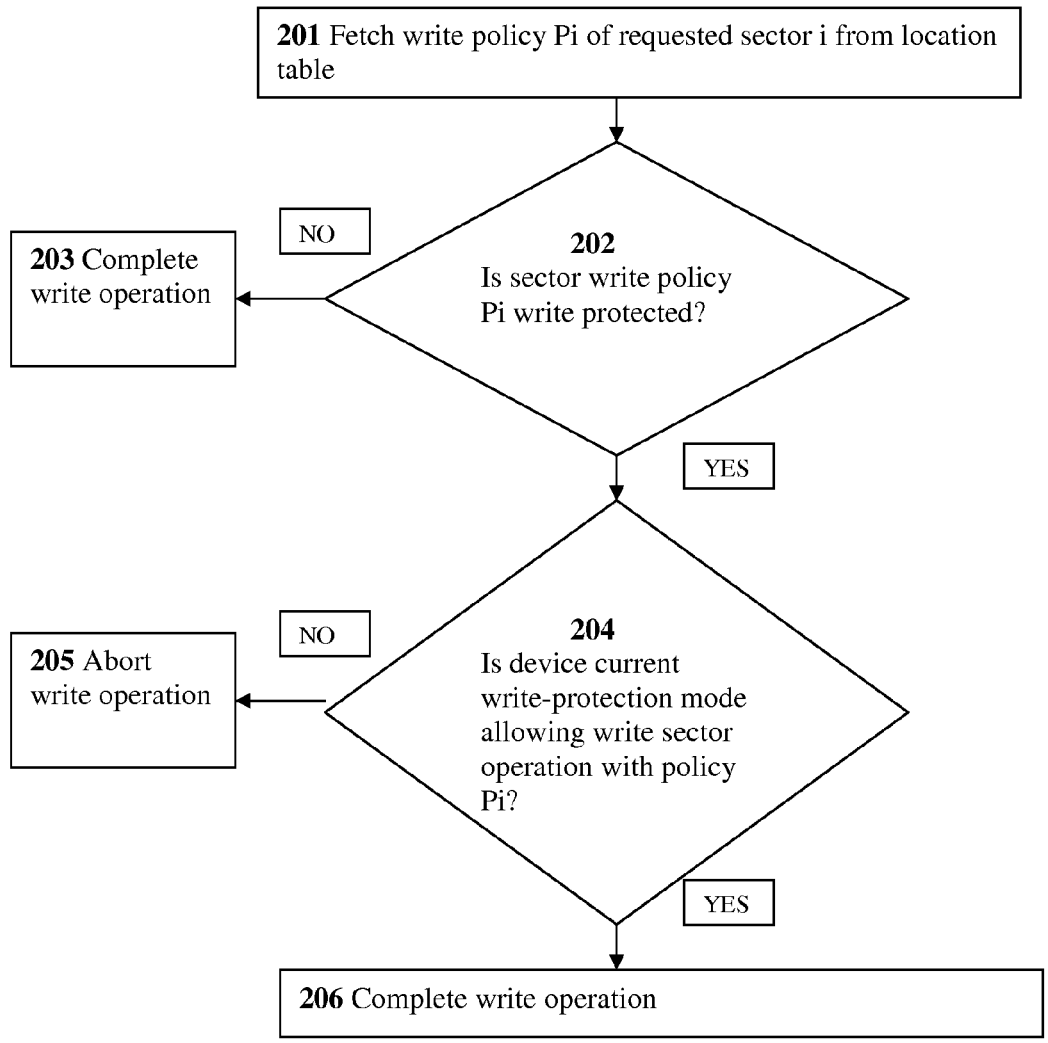
FIG. 2 is a schematic flowchart for writing a sector to a media device, in accordance with an embodiment of the present invention.

Reference is now made to FIG. 2, which is a schematic flowchart for writing a sector to a media device, in accordance with an embodiment of the present invention.

The following steps occur following a request from digital appliance 10 to write sector i into media device 20. The term sector is used here but other terms may be placed instead of it, such as a logical block etc.

In step 201 the write policy Pi of requested sector i is fetched from location table 26. Policy Pi refers to the policy which the media device 20 implements for writing sector i. This policy for sector i may be deduced from the policy of the file that includes sector i, as explained in FIG. 1.

In step 202 a check is made if the sector policy Pi has a write protection policy. If so, step 204 follows. If not, step 203 follows.

In step 203 since no write protection policy exists for sector i, sector is written.

In step 204 media device compares current internal media device mode and sector i write-protection policy Pi: Is device current write-protection mode allowing write sector operation with policy Pi? A device internal write-protection mode may be held within device mode unit 28. This internal write-protection mode may have a default value and that value may change, for instance if a password is supplied to the device, or if some other authentication scheme is exchanged with the device. If the device current write-protection mode allows policy Pi to be carried out then step 206 follows. If not, step 205 follows.

In step 205 write operation is aborted. This is because write policy Pi is not allowed according to internal device write-protection mode.

In step 206 write operation is carried out. This is because write policy Pi is allowed according to internal device write-protection mode.

In some embodiments file policies may be changed, such as during installation of programs, when some files may be given a different access policy. In some embodiments installed files on media device cannot be altered by default. In some embodiments a special access authority is required for altering installed files. In this manner protection is achieved from viruses while use of device is unchanged. In some embodiments, regular file allocation indexes of protected files are compared with internal file allocation indexes kept within file table 22 in order to identify possible virus attacks and consequently correct user FAT values to values within file table 22. It is therefore possible to both protect the content of the data from being altered and protect the allocation table for some or all files on media device.

In some embodiments write sector requests are allowed by default only for programs that are executed from the media device. In some embodiments this is implemented by sending media device access data information from digital appliance to media device. Media device can check access and allow or forbid write operations. In some embodiments this is implemented by requesting each write operation to precede a special request. This special request enables to monitor each application writing to media device. These steps may be preceded by a permission request when program initiates.

In some embodiments file allocation table is checked with internal file table 22 to make sure files are not removed or their fat entries are not altered. This may occur at the beginning when device is activated.

This series of steps displays how files on media device may be protected from being altered or removed by default on a single volume of the media device on a standard file system.

Figure 3:
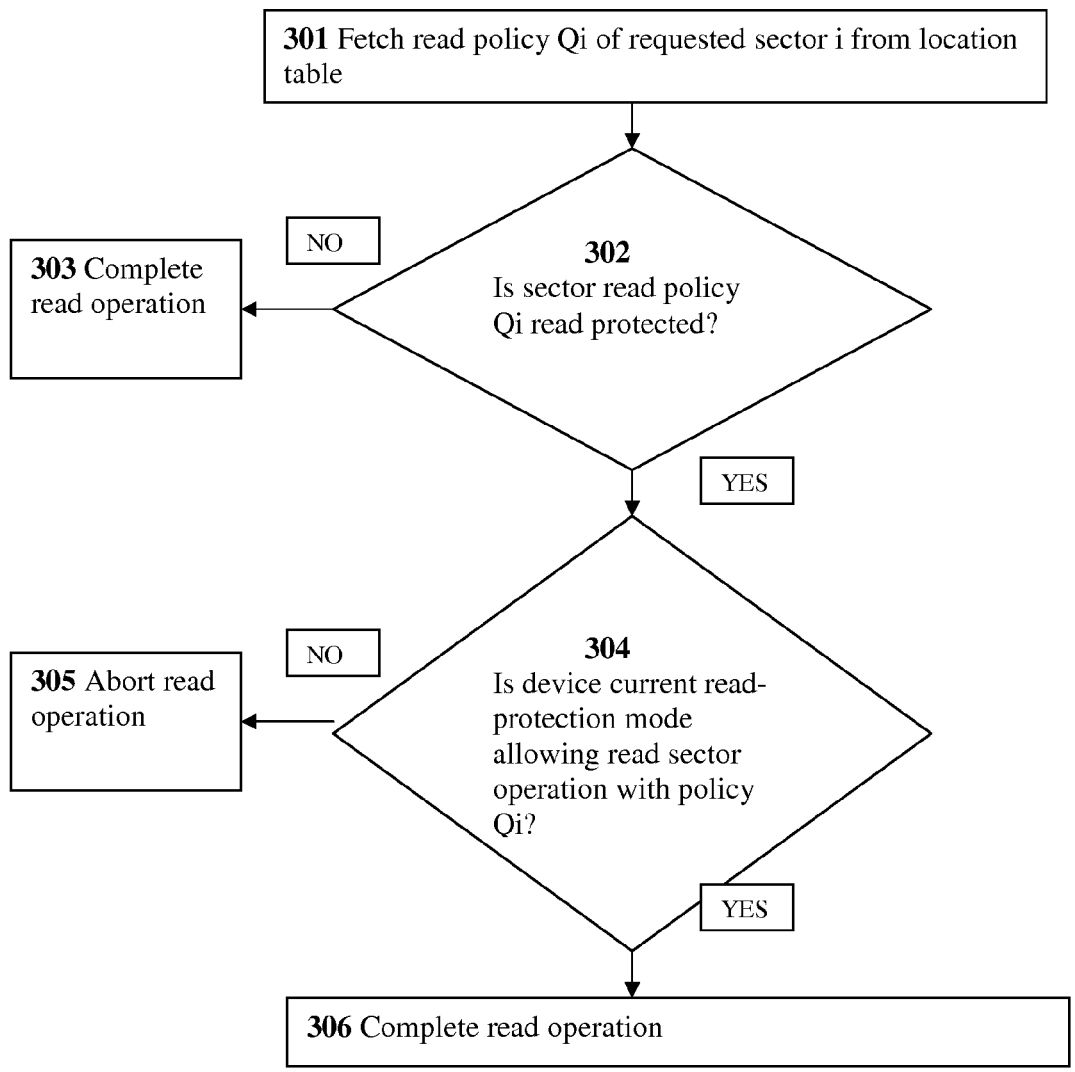
FIG. 3 is a schematic flowchart for reading a sector from a media device, in accordance with an embodiment of the present invention.

Reference is now made to FIG. 3, which is a schematic flowchart for reading a sector from a media device, in accordance with an embodiment of the present invention;

The following steps occur following a request from digital appliance 10 to read sector i from media device 20. The term sector is used here but other terms may be placed instead of it, such as a logical block etc.

In step 301 the read policy Qi of requested sector i is fetched from location table 26. Policy Qi refers to the policy which the media device 20 implements for reading sector i. This policy for sector i may be deduced from the policy of the file that includes sector i, as explained in FIG. 1.

In step 302 a check is made if the sector policy Qi has a read protection policy. If so, step 304 follows. If not, step 303 follows.

In step 303 since no read protection policy exists for sector i, sector is read.

In step 304 media device compares current internal media device mode and sector i read-protection policy Qi: Is device current read-protection mode allowing read sector operation with policy Qi? A device internal read-protection mode may be held within device mode unit 28. This internal read-protection mode may have a default value and that value may change, for instance if a password is supplied to the device, or if some other authentication scheme is exchanged with the device. If the device current read-protection mode allows policy Qi to be carried out then step 306 follows. If not, step 305 follows.

In step 305 read operation is aborted. This is because write policy Qi is not allowed according to internal device read-protection mode.

In step 306 read operation is carried out. This is because read policy Qi is allowed according to internal device read-protection mode.

In some embodiments sensitive files such as personal data or corporate data may be protected in this manner to avoid exposing sensitive data while allowing media device to be used with different computers. In some embodiments some computers may have authentication means to access protected data. In some embodiments a password is required to access data.

This series of steps displays how files on media device may be protected from being read in a default manner on a single volume of the media device on a standard file system.

In some embodiments it is possible to back up files which are not protected. In some embodiments it is not possible to back up read protected files. In some embodiments it is possible to remove all protected files. In some embodiments directories may become protected by a security policy. In some embodiments a policy protects data until a password is supplied. In some embodiments a policy is protected according to authentication scheme. In some embodiments a policy is protected from writing but enables reading.

In some embodiments files on media device which may infect host digital appliance with various hazards such as viruses are prevented from being read by digital appliance. In such cases media device may protect digital appliances from being affected by infected files located on media device.

In some embodiments media device internally decides which files should not be allowed read permission by default, such as by file suffix or by other means. For example, device may disallow reading contents of executable files according to their suffixes or permissions.

Figure 4:
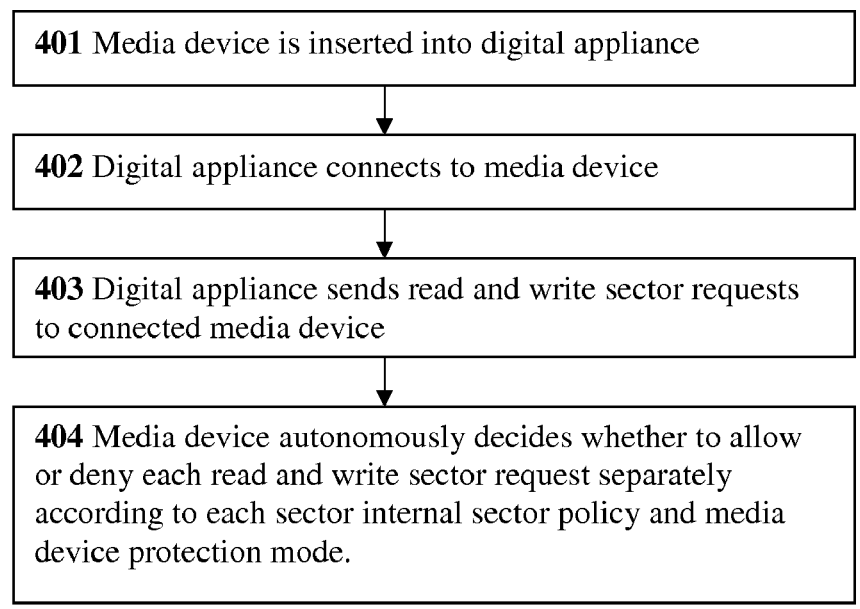
FIG. 4 is a schematic flowchart for a digital appliance connecting with and making use of a media device, in accordance with an embodiment of the present invention.

Reference is now made to FIG. 4, which is a schematic flowchart for a digital appliance connecting with and making use of a media device, in accordance with an embodiment of the present invention;

In step 401 media device is inserted into digital appliance. This may actually include any various manner of connection between media device and digital appliance.

In step 402 digital appliance connects to media device. This connection may be an automatic connection such as USB connection or any other type of connection. Following this step, digital appliance may issue commands to media device.

In step 403 digital appliance sends read and write sector requests to connected media device. Other requests may occur as well.

In step 404 media device autonomously decides whether to allow or deny each read and write sector request separately according to each sector internal sector policy and media device protection mode. According to storage firewall 14 of FIG. 1, each sector holds a policy. According to that policy media device may autonomously decide whether to allow or deny each requested command as requested by digital appliance. The policy of each sector or block may be decided upon internally by media device, based on the file that sector or block belongs to. The policy for each sector is then compared to the internal protection mode of the media device which may be held within device mode unit 28.

This series of steps display how a media device may connect with a digital appliance and allow usage of its contents while media device autonomously implement policies for each file, allowing access to allowed files and blocking access to forbidden files.

In some embodiments access to restricted files is allowed by programs installed on media device but blocked from programs not installed on media device. In this manner, such restricted files may be protected from access by programs residing on digital appliance and accessible to programs installed on media device. This protection may be implemented for read access and write access. In the write access case, files are readable by programs not installed on media device but cannot be altered by programs not installed on media device, hence offering better protection from viruses and other malware. In the read access case, files are not readable by programs not installed on media device but readable by programs installed on media device hence offering better privacy and security.

In some embodiments media device may include a policy decision logic unit, an internal entity for setting file access restrictions for files residing on media device. This unit may set access policies to newly added files to media device. For example, if an executable program is placed on media device, policy decision logic unit may change its file access policies.

Figure 5:
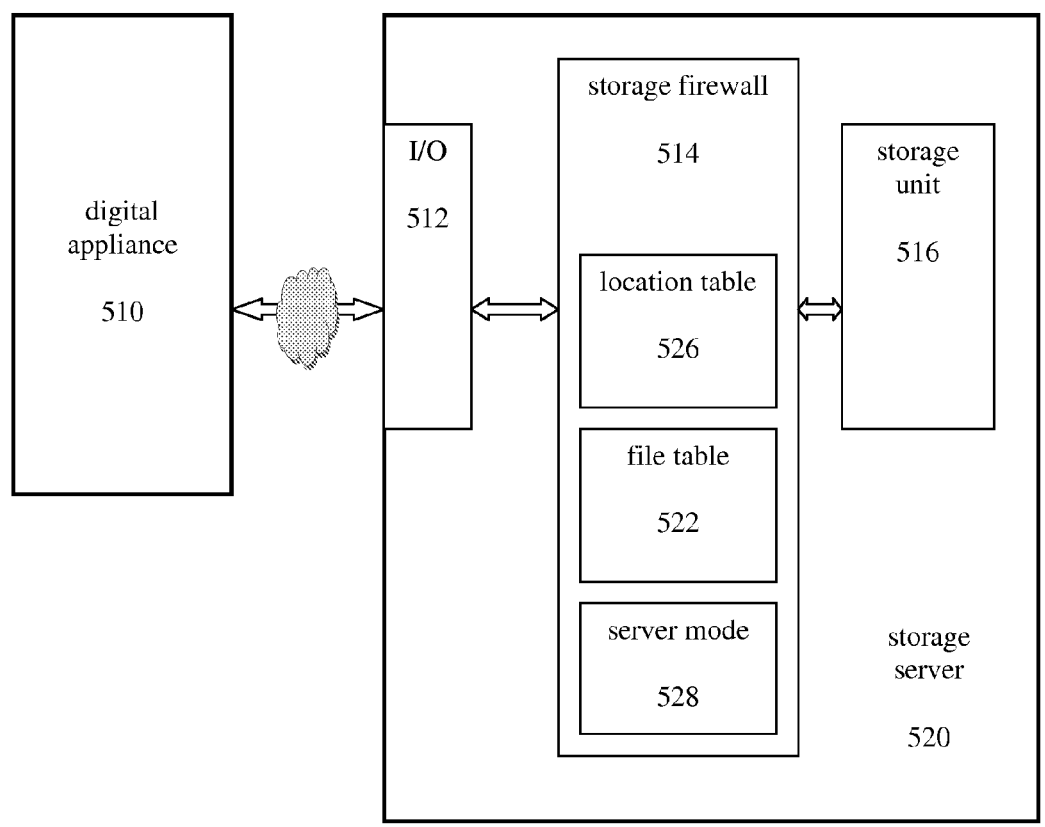
FIG. 5 is a block diagram illustration of a storage server with a storage firewall connected to a digital appliance over the network, according to an embodiment of the present invention.

FIG. 5 is a block diagram illustration of a storage server with a storage firewall connected to a digital appliance over the network, according to an embodiment of the present invention comprising a storage server 520 connected to a digital appliance 510, for example a computer connected to storage server over the network. The storage server serves as a data storage unit for digital appliance 510. Storage server 520 comprises an I/O unit 512 to communicate with digital appliance 510. Storage server further comprises a storage unit 516 comprising of non-volatile memory in which both secure and non-secure files may be stored together. Storage server further comprises a storage firewall 514 which may be implemented as a block based file management system such as sector based file system. Storage firewall is located between I/O unit 512 and storage unit 516. Storage firewall may block requests to storage unit 516. Storage firewall holds necessary data for deciding whether or not to allow requested commands received from I/O unit to be carried out. The storage firewall 514 is also responsible for keeping track of protected files as well as other responsibilities. For carrying out these tasks storage firewall 514 comprises of file table 522, a location table 526 and a server mode unit 528. The file table 522 holds relevant information concerning the stored files in the storage unit, information such as file LBA locations occupied by each file, file status, file availability etc. The location table 526 may hold permission values for each LBA location in storage unit 516, information which may be deduced from information located in file table 522. The storage firewall uses the information stored in the file table in the process of determining access to stored files. In a further embodiment of the present invention, file management rules define file access levels for respective files. These rules define, for example, which files the user will be able to access, or alter. Some aspects relevant to storage server are further explained in disclose of patent A as mentioned above. Similar to patent A, a plurality of different enforcement policies both internal and external to storage server are enforced from within storage server. These policies are located within storage firewall 514 in location table 526. These policies may contain permission values for each LBA location in storage unit 516 for allowing or rejecting read and/or write commands based on permission policy for a specific LBA. These policies are enforced by storage server and not by digital appliance, therefore not requiring any special activity from digital appliance 510 by default. In addition the policies are enforced on a block level or LBA level and may be enforced using a single volume on storage server where protected and unprotected files reside. In some embodiments storage firewall 514 further comprises a server mode 528 holding an internal policy mode of the server for a specific connected digital appliance or for a group of digital appliances. Each LBA policy in location table 526 may be compared to internal policy mode and be carried out or blocked based on the combination result of the two policies. Storage firewall may hold permissions for files in file table 522 and based on this permission information, update the policy of each LBA contained in each of the files within file table 522 to have the same security policy as the file that LBA is contained in. This policy for each LBA may be updated and stored in location table 526. In some embodiments internal storage firewall may make internal decisions as for file permission policies, for example based on file suffix. For example, a storage firewall may decide that executable files with a suffix "exe" may have certain policies by default.

In some embodiments, storage firewall 514 identifies executable files or other files, which may infect digital appliance that storage unit connects to. Storage firewall 514 may in some cases limit access to such files that may pose a threat to digital appliance. This access limitation may be implemented by removing read permission for such files. An example implementation may include denying some or all of the read data commands arriving from digital appliance for these files. In this manner it may be possible to increase protection of digital appliance from storage server that digital appliance connects to, such that digital appliance is protected from being infected by storage server.

In another embodiment, storage firewall 514 identifies executable files located on storage unit and prevents any write commands to those files, thereby protecting files on storage server from extracting viruses and other malware.

In another embodiment, storage firewall 514 includes information about sensitive files and prevents any read commands to those files by default, thereby protecting sensitive files on storage server from being accessed in an unauthorized manner.

In another embodiment, storage firewall 514 includes information about important files and prevents any write or delete commands to those files, thereby protecting by default important files on storage server from being altered or removed in an unauthorized manner.

It may be appreciated by those skilled in the art of the present invention that the following advantages exist in this invention, over the existing mechanisms:

(a) With the present invention, it may be possible to implement different policies to files included on a single partition using a standard, sector based file system.

(b) With this invention it is possible to protect data from viruses and other hazardous programs in a default manner when two devices connect without requiring running an external application.

(c) The present invention may allow protecting sensitive data on a single partition along with other unprotected files.

(d) The present invention may allow protecting digital appliance from viruses and other hazardous programs located on media device that connects to that digital appliance in a default manner without requiring running an external application.

(e) Protection as described above is made by default without requiring user to actively protect device or appliance.

Conclusion, Ramifications and Scope

Accordingly, the reader will see that the closure of this invention provides a method to protect data on a media device even in a single partition, using a standard file system which is sector based. Furthermore with the media device firewall protection, there are additional advantages in that:

(a) User is not required to actively participate in data protection.

(b) No external program is required to run in order to protect files. All protection is managed from within media device in a default manner.

(c) Digital appliance may be protected from infected files on media device connected to digital appliance.

Although the description above contains many specifications, these should not be constructed as limiting the scope of the invention but as merely providing illustrations of some exemplary embodiments of this invention.

For example, other ways than as illustrated in FIG. 1 may be applied to protect data on a media device; other uses for different policies may be applicable, similar to dividing a media device into different partitions; Installation of new programs on media device may require a password or be carried out on a specified computer. White-listing of allowed programs may be used for allowing only certain programs to run, much like a network firewall is configured for trusting certain sites.

The term media device and digital appliance are used throughout this closure for clarity, but in fact a digital appliance may be a media device and a media device may be a digital appliance.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is expected that during the life of this patent many relevant secured storage media devices and systems will be developed and the scope of the terms herein, particularly of the terms "media device" and "non-volatile storage", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A file storage unit for storing data files via an external file interface, said external file interface accessible to a directly attached external unit said file storage unit comprising:
   a physical file storage for storing files homogenously on at least part of said physical file storage;
   said external file interface for direct access of said external unit supporting sector level commands for direct-attached storage;
   a storage firewall located in between said physical file storage and said external file interface containing sector level rules associated with respective files having a file access restriction for allowing or blocking sector level requests between said external file interface and said at least part of physical file storage for storing files homogenously;
   a policy mode indicator containing a policy mode for altering said sector level rules of said storage firewall whereby said file storage unit autonomously allows or blocks access to said files having file access restriction from said directly attached external unit according to said sector level rules associated with said files having a file access restriction and said policy mode of said policy mode unit.

2. The file storage unit of claim 1 wherein said sector level rules include restrictive write permissions for sectors associated with files of programs located on said file storage unit whereby said programs located on said file storage unit are protected from alteration by said directly attached external unit.

3. The file storage device of claim 1 wherein said sector level rules include restrictive read permissions for sectors associated with files having restrictive read permissions located on said file storage unit whereby said files having restrictive read permissions are protected from being read by said directly attached external unit.

4. The file storage device of claim 1 wherein said sector level rules include restrictive permissions for sectors associated with files having restriction policies on said file storage unit.

5. The file storage device of claim 1 wherein said sector level rules include restrictive read permissions for sectors associated with executable files residing on said file storage unit whereby said external unit is protected from infected executable files residing on said directly attached file storage unit.

6. The file storage device of claim 1 wherein said policy mode contained in said policy mode indicator is changed by sending credentials to said file storage device from directly attached said external unit.

7. The file storage device of claim 1 further comprising a policy decision logic unit for setting file access restrictions to said files residing on said file storage unit.

8. A method of protecting files stored on a file storage unit, some of which have restricted access conditions, from a directly attached external device configured for accessing files stored on said file storage unit through an external file interface using sector level commands for direct-attached storage the method comprising:
   a. storing said files homogenously on sectors within a single partition of said file storage unit,
   b. identifying permissions of said homogeneously stored files as either unrestricted files or restricted access files,
   c. identifying permissions for sectors associated with said restricted access files according to said identified file permissions,
   d. calculating permissions for requested sector internally within said file storage unit using said identified permissions of said sector and a current policy mode,
   e. allowing full accessibility functionality for sectors of said unrestricted files, whilst restricting accessibility functionality to sectors of said restricted files according to said internally calculated permissions of said sectors associated with said stored restricted access files.

9. A method according to claim 8 wherein said current policy mode is changed by receiving external credentials from said directly attached external device to change said calculated permissions for requested sector.

10. A method according to claim 8 wherein said identified permissions for sectors associated with said restricted access files include write policy restrictions for files which are executable programs whereby said directly attached external device cannot alter said executable programs.

11. A method according to claim 8 wherein said identified permissions for sectors associated with said restricted access files include read policy restrictions for files which are executable programs whereby said directly attached external device cannot read and execute said executable programs thereby protecting said directly attached external device from infected executable files residing on said storage unit.

12. A method according to claim 8 wherein said current policy mode is changed according to logical rules to change said calculated permissions for requested sector.

13. A file storage device for storing files in sectors for subsequent access through an external file interface said file interface accessible to a digital appliance directly attached to said file storage device, the device comprising:

said externally accessible interface by said directly attached digital appliance for direct access of said files through sector level commands to support direct-attached storage, and an internal inaccessible interface located above said sector level access to limit access to certain files according to an indication of sector level rules for said stored sectors associated with a respective file of a file access restriction, and an internal policy mode indicator containing a policy mode for internally altering access restrictions as indicated by said indication of said sector level rules associated with a respective file of a file access restriction in respect to said policy mode whereby said digital appliance accesses said stored files on directly attached said storage device according to said indication of sector level rules associated with respective said stored files in respect to said policy mode.

14. The file storage device of claim 13 wherein said policy mode of said internal policy mode indicator is changed by sending credentials from said directly attached digital appliance through said externally accessible interface.

15. The file storage device of claim 13 further comprising a policy decision logic unit for setting file access restrictions to files residing on said file storage device.

16. A method according to claim 8 wherein said identified permissions for sectors associated with said restricted access files include restricted read permissions for sectors associated with files having restricted read permissions.

17. A method according to claim 16 wherein said identified permissions for sectors associated with said restricted access files include restricted write permissions for sectors associated with files having restricted write permissions.

* * * * *